United States Patent [19]

Mau, deceased et al.

[11] 4,083,630
[45] Apr. 11, 1978

[54] FADE IN AND FADE OUT ARRANGEMENT FOR A MOTION PICTURE CAMERA

[75] Inventors: Robert C. Mau, deceased, late of Chicago, Ill., by Donna M. Mau, administratrix; Erwin E. Figge, Des Plaines, Ill.

[73] Assignee: Bell & Howell Company, Chicago, Ill.

[21] Appl. No.: 598,502

[22] Filed: Jul. 24, 1975

[51] Int. Cl.² .......................................... G03B 21/36
[52] U.S. Cl. ................... 352/91 C; 352/141; 354/38
[58] Field of Search ............... 352/91 R, 91 C, 91 S, 352/141; 354/22, 38, 40, 41, 42, 43

[56] References Cited

U.S. PATENT DOCUMENTS

| | | | |
|---|---|---|---|
| 3,197,783 | 7/1965 | Ahn | 354/22 |
| 3,517,990 | 6/1970 | McGillion | 352/91 C |
| 3,649,109 | 3/1972 | Isono | 352/91 S |
| 3,696,720 | 10/1972 | Vinson | 354/22 |
| 3,701,594 | 10/1972 | Keiner | 352/91 S |
| 3,950,083 | 4/1976 | Yoshimura | 352/91 C |

*Primary Examiner*—Monroe H. Hayes
*Attorney, Agent, or Firm*—John E. Peele, Jr.; John H. Moore; Aaron Passman

[57] ABSTRACT

The disclosure relates to a fade circuit for a motion picture camera of the type which includes an automatic exposure control. The fade circuit includes a light emitting diode which illuminates the light sensitive device of the automatic exposure control to augment the ambient light levels normally received by the light sensitive device. The intensity of the light emitted by the light emitting diode is controlled by a variable current source which provides the light emitting diode with continuously increasing or decreasing current for increasing or decreasing the intensity of the light from the light emitting diode. Fade-in is obtained as the light intensity of the light emitting diode is gradually decreased from an initial intensity sufficient to close the diaphragm opening to zero intensity to allow the diaphram to assume an opened condition corresponding to ambient light levels. Fade-out is obtained as the light intensity of the light emitting diode is gradually increased from an initial zero intensity which causes the diaphragm to be in an open condition corresponding to ambient light levels to an intensity sufficient to close the diaphragm opening.

10 Claims, 3 Drawing Figures

FADE IN AND FADE OUT ARRANGEMENT FOR A MOTION PICTURE CAMERA

BACKGROUND OF THE INVENTION

The invention is generally directed to a fade-out circuit for a motion picture camera and more particularly to a fade-in and fade-out circuit for use in a motion picture camera having an automatic exposure control.

Motion picture cameras having automatic exposure control are well known in the art. The automatic exposure control of such cameras generally include a light sensitive device which controls the size of the objective lens diaphragm opening corresponding to the ambient light levels of the scenes to be recorded on the film. They operate so that the size of the diaphragm opening is inversely related to the intensity of the ambient light.

It has been found that in use of motion picture cameras, a motion picture can be disjointed to a viewer when the subject matter of the recorded scenes or activities changes significantly. It has been found that it is particularly advantageous to provide for fading-in and fading-out of scenes to improve the continuity of motion pictures. Early fade-in and fade-out arrangements included mechanical mechanisms for continuously opening and closing the objective lens diaphragm. Mechanical manipulation of these mechanisms was necessary and thus such mechanisms were cumbersome in use because both hands had to be utilized for operating the camera and for fade-in and fade-out control. The cumbersome use of such devices resulted in the cameras being jiggled during operation and thus rendered movies which were difficult to view because of jitter. Also, fade-in and fade-out of uniform durations and rates were impossible to achieve.

It is therefore a general object of the present invention to provide a new and improved fade arrangement for a motion picture camera.

It is a more particular object source the present invention to provide a fade circuit for light source motion picture camera of the type which includes an automatic exposure control.

It is a still more particular object of the present invention to provide a fade circuit for a motion picture camera having an automatic exposure control which does not require changes in the automatic exposure control mechanism.

It is a more particular object of the present invention to provide a fade circuit for a motion picture camera which is automatic requiring very little activation manipulation and which provides uniform fade-in and fade-out durations and rates.

SUMMARY OF THE INVENTION

The invention provides a new and improved fade circuit for a motion picture camera of the type which includes an automatic exposure control having a light sensitive device for controlling the size of the objective lens diaphragm opening in inverse relation to ambient light level conditions. The fade circuit of the present invention comprises a light source arranged relative to the light sensitive device for illuminating the light sensitive device and augmenting the ambient light levels normally received by the light sensitive device, the light source being capable of providing light of sufficient intensity so as to cause the automatic exposure control to close the diaphragm opening. The fade circuit additionally comprises an intensity control means coupled to the light source for controlling the intensity of the light of the light source to thereby cause the light source to illuminate the light sensitive device with light of gradually varying intensity so as to cause the automatic exposure control to gradually alter the diaphragm opening size between a closed condition and a condition corresponding to only ambient light levels.

BRIEF DESCRIPTION OF THE DRAWINGS

The features of the present invention which are believed to be novel are set forth with particularity in the appended claims. The invention, together with further objects and advantages thereof, may best be understood by reference to the following description in conjunction with the accompanying drawings, and in the several figures of which like reference numerals indicate identical elements and in which:

DESCRIPTION OF THE PREFERRED EMBODIMENT

Figure 1:
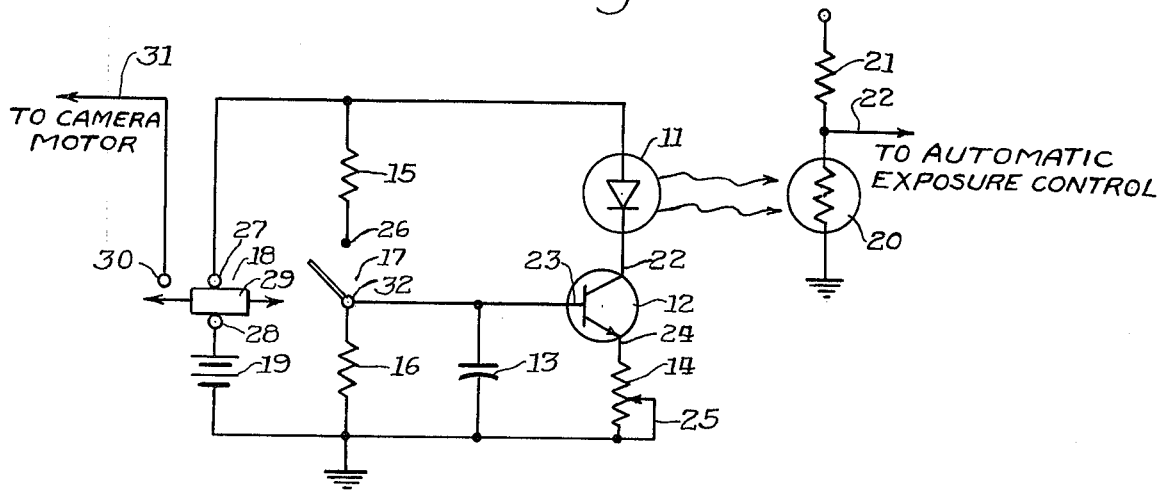
FIG. 1 is a schematic circuit diagram of the preferred embodiment of the present invention.

Referring now to FIG. 1, the fade circuit there shown comprises light source 11, transistor 12, capacitor 13, resistors 14, 15, and 16, switch 17, switch 18 and battery 19. Also shown in FIG. 1 is light sensitive device 20 of an automatic exposure control of the motion picture camera into which the fade circuit of FIG. 1 is incorporated and may comprise for example a standard photocell. Also shown in FIG. 1 is resistor 21 and line 22 which provides the automatic exposure control with a signal representative of the light level received by photocell 20.

Light source 11 may be any type of light source which is current sensitive and for this preferred embodiment is a light emitting diode. It is arranged relative to photocell 20 to illuminate photocell 20 and augment the ambient light levels normally received by the photocell.

Light source 11 is coupled to an intensity control means which controls the intensity of the light emitted from the light emitting diode. The control means includes a variable current source which includes transistor 12 and capacitor 13. Resistors 14, 15, and 16, switch 17 and battery 19 comprise a capacitor charging and discharging means for capacitor 13. Transistor 11 includes collector 22, base 23, and emitter 24. Light emitting diode 11 is coupled in series with transistor 12 at collector 22. Resistor 14 is a variable resistor having wiper 25 and thus comprises a variable impedance element coupled between emitter 24 of transistor 12 and ground potential. Capacitor 13 is coupled between base 23 and ground in parallel with resistor 16.

Resistor 15 is coupled from terminal 26 of switch 17 to light emitting diode 11 and to terminal 27 of switch 18. Battery 19 has its negative side coupled to ground and its positive side coupled to terminal 28 of switch 18. Switch 18 is of the sliding bar variety and as shown in FIG. 1 connects terminal 27 to terminal 28. As the sliding bar 29 is slid into contact with terminal 30, the battery potential is also applied to the camera motor via line 31. Switch 18 therefore has an intermediate position whereby the fade circuit of the camera can receive operating potentials without the camera motor running.

The variable current source comprising transistor 12 provides light emitting diode 11 with continuously increasing and continuously decreasing currents depending upon whether fade-in or fade-out is desired. Light source 11 is selected to have an intensity sufficient to cause the automatic exposure control to close the objective lens diaphragm opening so that the diaphragm opening may be altered between a condition corresponding to ambient light levels received by photocell 20 and a closed condition.

As used herein, when the diaphragm is described as being in a "closed condition," it is to be understood that this condition corresponds to the minimum effective aperture size of the camera diaphragm which could be fully closed.

Resistors 15 and 16 when switch 17 is closed in a first operative position causes capacitor 13 to be charged by the potential derived from battery 19 at terminal 32 by resistors 15 and 16. As capacitor 13 charges, transistor 12 will conduct an increasing amount of current to thereby cause the light intensity of light emitting diode 11 to correspondingly increase. Thus, resistors 15 and 16 form at terminal 32 a source of charging potential for use by capacitor 13.

The brightness of the light emitting diode 11 may be varied by adjusting wiper 25 of resistor 14. This provides a means for compensating for component tolerances.

In operation, when pictures are to be taken and fade-in is desired, switch 18 is first placed into the condition shown to connect battery 19 to the fade circuit. Switch 17 is closed to its first operative position thus allowing capacitor 13 to be charged by the voltage developed at terminal 32 derived from battery 19 by resistors 15 and 16. After capacitor 13 is fully charged, transistor 12 will be conducting its maximum current thus causing light emitting diode 11 to emit its maximum intensity light to cause the automatic exposure control to close the objective lens diaphragm opening responsive to photocell 20.

After capacitor 13 is fully charged, switch 17 is opened to a second operative position and switch 18 is manipulated such that slide bar 29 also contacts terminal 30 to energize the camera motor. As the initial frames are exposed, capacitor 13 is discharged through resistor 16 causing the current conducted by transistor 12 to be decreased and thus causing the light intensity of light emitting diode 11 to be continuously decreased. As the light from light emitting diode 11 decreases, the automatic exposure control responsive to the photocell 20 causes the diaphragm opening to gradually open. When capacitor 13 is fully discharged, only ambient light will be received by photocell 20 and it will cause the automatic exposure control to open the diaphragm opening by an amount corresponding to the ambient light level received by photocell 20 for further picture taking.

When fade-out is desired, switch 17 is closed to its first operable position to cause capacitor 13 to charge thus increasing the amount of current conducted by transistor 12. As the current conducted by transistor 12 increases the light emitted by light emitting diode 11 increases and gradually will cause the automatic exposure control to close the objective lens diaphragm opening.

Figure 2:
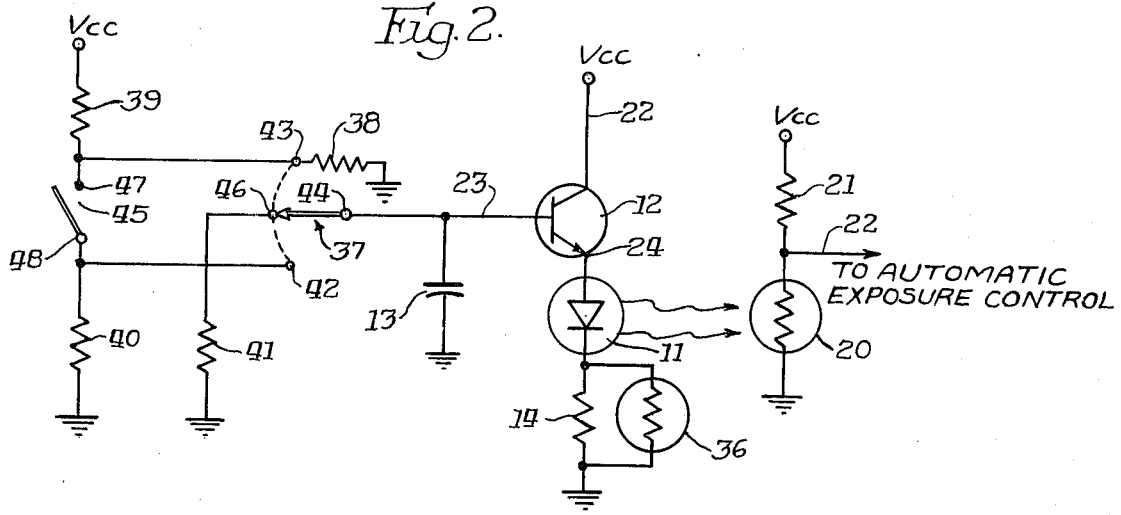
FIG. 2 is a schematic circuit diagram of a fade circuit embodying addition features of the present invention.

Referring now to FIG. 2, the circuit there shown is another embodiment of the present invention. To the extent that the components of FIG. 2 are the same as FIG. 1, the identical reference numerals have been maintained.

The fade-out circuit of FIG. 2 is substantially similar to the fade-out circuit of FIG. 1 except that a slightly different switching arrangement is provided for charging and discharging capacitor 13 and light emitting diode 11 is now in the emitter circuit of transistor 12. Also, temperature sensitive resistor 36 is in parallel with resistor 14 to compensate for temperature variations to maintain the rate in which the current conducted by transistor 12 increases and decreases constant. Switch 37 is a three position switch having a common terminal 44 and terminals 42 and 43 corresponding to first and second operative positions. Terminal 46 is utilized for maintaining the fade circuit in an off condition. Common terminal 44 is coupled to base 23 of transistor 12 and terminal 46 is coupled to ground through resistor 41. Resistor 39, collector 22, and resistor 21 are all coupled to a source of operating potential. Switch 45 is a section of the camera motor control switch which is normally closed but opens when the camera is running. It includes terminal 47 which is coupled to resistor 39 and terminal 48 which is coupled to resistor 40 which is in turn coupled to ground. Terminal 48 is also coupled to terminal 42 of switch 37.

Prior to the commencement of picture taking, switch 45 is closed developing at terminals 42 of switch 37 a source of charging potential to charge capacitor 13. Switch 37 is placed in contact with terminal 42 to connect the charging potential to capacitor 13. Capacitor 13 upon being charged, forward biases transistor 12 to cause the light emitting diode 11 to be on and to thus cause the automatic exposure control to initially almost close the lens diaphragm. When picture taking is commenced, switch 45 is opened to cause the capacitor 13 to discharge to cause the automatic exposure control to open the diaphragm in a manner identical to the operation of the circuit of FIG. 1 as previously described. In this manner fade-in is provided.

When fade-out is desired, switch 37 is placed in contact with terminal 43 which provides through resistor 39 a charging potential developed at terminal 43 between resistors 39 and 38 to charge capacitor 13. In doing so, capacitor 13 causes transistor 12 to conduct an increasing amount of current to light emitting diode 11 to cause its light intensity to increase. As the photocell 20 is illuminated by the increased intensity of light emitting diode 11, the automatic exposure control will cause the objective lens diaphragm to close from a condition corresponding to the ambient light received by the photocell to closed condition.

Motor switch 45 and fade circuit switch 37 may preferrably be coupled together so that when switch 45 is returned to its normal closed position, fade control switch 37 will contact terminal 46 to disable the fade circuit. Thus, it will be assured that the face circuit is disabled unless it is intended to be utilized.

Figure 3:
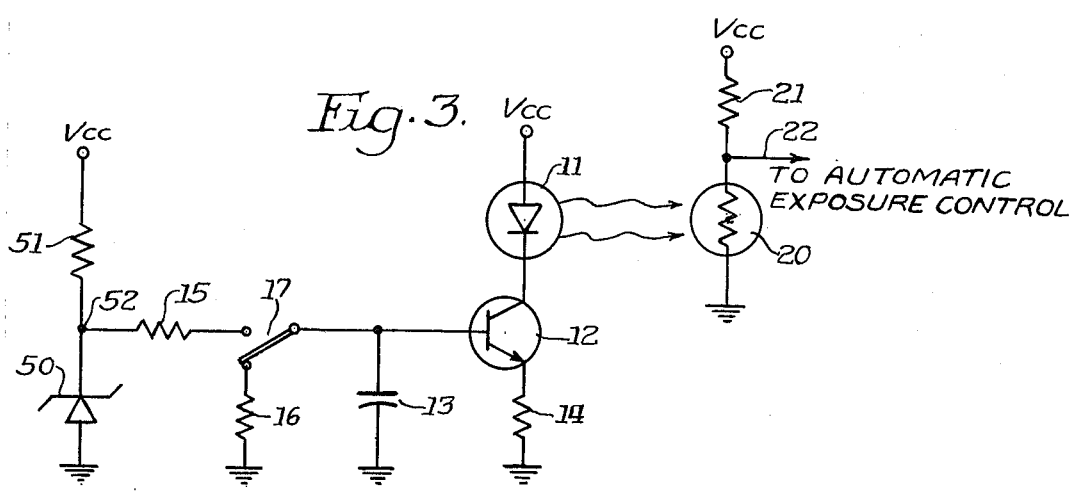
FIG. 3 is a schematic circuit diagram of a fade circuit of still another embodiment of the present invention.

Referring now to FIG. 3, the embodiment there shown is substantially identical to the embodiment of FIG. 1 except that resistor 14 is not variable and the circuit of FIG. 3 includes zener diode 50 and resistor 51. Also, resistor 51, light emitting diode 11, and resistor 21 are coupled to a source of operating potential which is not represented by a battery. Of course, a battery could be utilized for supplying the operating potential.

The embodiment of FIG. 3 provides for maintaining the charging potential for capacitor 13 at a constant level so that the fade-in and fade-out durations and rates are constant not withstanding fluctuations or variations in the operating potential applied to the circuit. This may be important when such a circuit is battery operated and the batteries are degraded over their life.

To this end, the circuit of FIG. 3 includes resistor 51 which is coupled to a source of operating potential and zener diode 50 coupled from resistor 51 to ground. At point 52 because of zener diode 50, a constant charging potential will be developed not withstanding variations in the operating potentials. In all other respects, the operation of FIG. 3 is identical to that of FIG. 1.

As is clear from the foregoing description, the present invention provides a fade circuit for a motion picture camera of the type which includes an automatic exposure control which does not necessitate any change in the automatic exposure control mechanism. Also, the fade-in and fade-out durations and rates may be varied and once determined, may be held constant through the use of a zener diode such as is shown in FIG. 3. Also, because the photocell illumination is always held at a constant level during normal picture taking, the amount of light required to change the diaphragm opening size a given number of f/stops is always the same. Thus, the separate light source contribution to the total illumination on the photocell during the fade-in and fade-out operation is the same at both ends of the scene brightness scale. For example, the total illumination on the photosensor during the fade-in and fade-out operation is the same at f/1.1 or f/22.

Also, the light emitted from the light emitting diode 11 may also be made visible in the view finder of the camera. This affords the operator with a ready indication that the camera is in fade-in or fade-out operation.

While particular embodiments of the invention have been shown and described, modifications may be made and it is intended in the appended claims to cover all such modifications as may fall within the true spirit and scope of the invention.

What is claimed is:

1. In a motion picture camera of the type which includes an automatic exposure control for controlling the size of the objective lens diaphragm opening in inverse relation to ambient light level conditions, a new and improved fade circuit comprising:
    a light source capable of providing light of controlled intensity;
    a light sensitive device disposed to receive both ambient light for controlling the size of the opening in the objective lens diaphram in inverse relation to ambient light level conditions, and the light from said light source for augmenting the received ambient light; and
    intensity control means coupled to said light soource for controlling the intensity of the light of said surce to thereby cause said light source to illuminate the light sensitive device with light of gradually varying intensity so as to cause the automatic exposure control to gradually alter the diaphram opening size between a closed condition and a condition corresponding to only ambient light levels.

2. A fade circuit in accordance with claim 1 wherein said intensity control means comprises a variable current source for providing current of continuously increasing or decreasing magnitude and wherein said light source is current sensitive for providing light having an intensity which is directly related to the magnitude of the current provided by said variable current source.

3. A fade circuit in accordance with claim 2 wherein said variable current source comprises a transistor having a collector, a base and an emitter, a capacitor coupled to said base, and means for charging and discharging said capacitor to thereby cause said transistor to provide said current of increasing and decreasing magnitude.

4. A fade circuit in accordance with claim 3 wherein said light source comprises a light emitting diode.

5. A fade circuit in accordance with claim 4 wherein said light emitting diode is coupled in series with said transistor.

6. A fade circuit in accordance with claim 5 wherein said light emitting diode is coupled to said emitter of said transistor.

7. A fade circuit in accordance with claim 5 wherein said light emitting diode is coupled to said collector of said transistor.

8. A fade circuit in accordance with claim 7 wherein said charging and discharging means includes a switch operable between first and second positions, said switch when in said first position causes said capacitor to charge and when in said second position causes said capacitor to discharge.

9. A fade circuit in accordance with claim 8 wherein said charging and discharging means comprises a source of charging potential coupled to said switch for charging said capacitor and a zener diode for maintaining said charging potential constant.

10. In a motion picture camera of the type which includes an automatic exposure control for controlling the size of the objective lens diaphragm opening in inverse relation to ambient light leevel conditions, a new and improved fade circuit comprising:
    a light source being current sensitive and capable of providing light of controlled intensity;
    a light sensitive device disposed to receive both ambient light for controlling the size of the opening in the objective lens diaphragm in inverse relation to ambient light level conditions, and the light from said light source for augmenting the received ambient light;
    a variable current source comprising a transistor having a collector, a base and an emitter, and a capacitor coupled to said base, said current source being coupled to said light source at said collector for providing said light source with current of continuously increasing or decreasing magnitude corresponding to the charge on said capacitor to thereby cause said light source to provide light of continuously increasing or decreasing intensity; and
    charging and discharging means coupled to said capacitor for charging and discharging said capacitor and including a source of charging potential, and a switch operable between first and second positions and coupled to said charging potential source, said switch when in said first position causes said capacitor to be charged and when in said second position causes said capacitor to be discharged whereby;
    when said switch is in said first position and as said capacitor is charged, said current source provides said light source with said current increasing in magnitude to thereby cause the intensity of the light provided by said light source to increase to cause said light sensitive device to decrease the diaphragm opening from a condition corresponding to ambient light levels to a closed condition, and when said switch is in said second position and as said capacitor is discharged, said current source provides said light source with said current decreasing in magnitude to thereby cause the intensity of the light provided by said light source to decrease to cause said light sensitive device to increase the diaphragm opening from a closed condition to a condition corresponding to ambient light levels.

* * * * *

UNITED STATES PATENT OFFICE
CERTIFICATE OF CORRECTION

PATENT NO. : 4,083,630
DATED : April 11, 1978
INVENTOR(S) : Robert C. Mau and Erwin E. Figge It is certified that error appears in the above—identified patent and that said Letters Patent are hereby corrected as shown below:

Column 5, line 51 (Claim 1, line 14), change the spelling of "soource" to --source--.

Column 5, line 52 (Claim 1, line 15), after "said" add --light--.

Column 5, line 53 (Claim 1, line 16), change "surce" to --source--.

Column 6, line 59 (Claim 10, line 30), after "discharged", add --,--.

Signed and Sealed this

*Twenty-sixth* Day of *February 1980*

[SEAL]

*Attest:*

SIDNEY A. DIAMOND

*Attesting Officer*     *Commissioner of Patents and Trademarks*